(12) United States Patent
Fang et al.

(10) Patent No.: US 12,630,227 B2
(45) Date of Patent: May 19, 2026

(54) OFF-ROAD VEHICLE

(71) Applicant: Zhejiang CFMOTO Power Co., Ltd., Zhejiang (CN)

(72) Inventors: Ying Fang, Hangzhou (CN); Guiming Shu, Hangzhou (CN)

(73) Assignee: Zhejiang CFMOTO Power Co., Ltd., Hangzhou (CN)

( * ) Notice: Subject to any disclaimer, the term of this patent is extended or adjusted under 35 U.S.C. 154(b) by 0 days.

(21) Appl. No.: 19/178,655

(22) Filed: Apr. 14, 2025

(65) Prior Publication Data

US 2025/0236342 A1      Jul. 24, 2025

Related U.S. Application Data

(63) Continuation of application No. 18/398,924, filed on Dec. 28, 2023, now Pat. No. 12,280,828.

(30) Foreign Application Priority Data

Dec. 30, 2022      (CN) .......................... 202211742546.5
Aug. 1, 2023      (CN) .......................... 202310959799.6

(51) Int. Cl.
B62D 21/18      (2006.01)
B60K 5/04      (2006.01)
(Continued)

(52) U.S. Cl.
CPC .............. B62D 21/183 (2013.01); B60K 5/04 (2013.01); B60K 13/02 (2013.01); B60K 13/06 (2013.01); B60K 17/16 (2013.01); B60K 17/22 (2013.01)

(58) Field of Classification Search
CPC ........ B62D 21/183; B60K 5/04; B60K 17/22; B62K 5/01; B60Y 2200/124
See application file for complete search history.

(56) References Cited

U.S. PATENT DOCUMENTS 6,454,040 B1 *   9/2002   Fukuda ................... B60K 11/08
                                                              180/230
8,091,657 B2 *   1/2012   Dieter ................. F16H 57/0489
                                                              296/193.03

(Continued)

FOREIGN PATENT DOCUMENTS

WO      WO-2020147417 A1 *   7/2020      ............. B60K 13/02
WO      WO-2020238112 A1 *   12/2020      ............... B62K 5/01

OTHER PUBLICATIONS

Computer generated English translation of WO 2020/147417 (Year: 2025).*

(Continued)

*Primary Examiner* — Paul N Dickson
*Assistant Examiner* — Tiffany L Webb
(74) *Attorney, Agent, or Firm* — Shewchuk IP Services, LLC; Jeffrey D. Shewchuk

(57)      ABSTRACT

An off-road vehicle includes a frame, a plurality of wheels, a prime mover assembly with an engine, and a drive train having front and rear differentials. The engine body defines a cylinder axis which slants upwardly and rearwardly, with a cylinder head mid-point defined where the cylinder axis intersects an exterior surface of the cylinder head. A cylinder front line running within the longitudinal mid-plane between the front differential output axis and a projection of the cylinder head mid-point on the longitudinal mid-plane has a cylinder front line length L1, cylinder rear line running within the longitudinal mid-plane between the rear differential output axis and the projection of the cylinder head mid-point on the longitudinal mid-plane has a cylinder rear line length L2, and a ratio of the cylinder front line length L1 to the cylinder rear line length L2 is in the range from 0.4 to 1.8.

20 Claims, 14 Drawing Sheets

(51) Int. Cl.

| | |
|---|---|
| *B60K 13/02* | (2006.01) |
| *B60K 13/06* | (2006.01) |
| *B60K 17/16* | (2006.01) |
| *B60K 17/22* | (2006.01) |

(56) References Cited

U.S. PATENT DOCUMENTS

| | | | | |
|---|---|---|---|---|
| 11,919,603 B2 * | 3/2024 | Li | ............................. | B62M 9/04 |
| 2022/0080822 A1 * | 3/2022 | Dong | ...................... | B60K 6/365 |
| 2022/0089243 A1 * | 3/2022 | Dong | ........................ | B62J 37/00 |
| 2022/0250704 A1 * | 8/2022 | Li | ............................ | B60K 5/04 |
| 2024/0083538 A1 * | 3/2024 | Bouchard | ................ | B62M 7/06 |
| 2024/0208599 A1 * | 6/2024 | Li | ............................ | B62J 43/20 |

OTHER PUBLICATIONS

Computer generated English translation of WO 2020/238112 (Year: 2025).*

* cited by examiner

OFF-ROAD VEHICLE

RELATED APPLICATION INFORMATION

The present application is a continuation of U.S. patent application Ser. No. 18/398,924 filed Dec. 28, 2023, now granted as U.S. Pat. No. 12,280,828, and claims the benefits of priority to Chinese Patent Application No. 202211742546.5, filed with the Chinese Patent Office on Dec. 30, 2022 and Chinese Patent Application No. 202310959799.6, filed with the Chinese Patent Office on Aug. 1, 2023. The entire contents of the above-referenced applications are incorporated herein by reference.

FIELD OF THE DISCLOSURE

The disclosure relates to the field of vehicles, and in particular to an off-road vehicle.

BACKGROUND OF THE DISCLOSURE

At present, off-road vehicles are increasingly popular among consumers, and the engines used in these vehicles are generally single cylinder internal combustion engines. The existing engine cylinder head for off-road vehicles is mostly arranged adjacent to the front. This requires the exhaust pipe and tubular muffler to go through the entire vehicle, resulting in higher temperatures near the driver's body, especially the legs when riding on the vehicle, thereby reducing the driver driving experience. At the same time, adjusting the position of the engine can easily lead to difficulties in seat arrangement and center of gravity deviation. Therefore, it is difficult to balance compactness and user comfort in the configuration of the engine and other components of off-road vehicles.

SUMMARY OF THE INVENTION

An off-road vehicle is disclosed. The off-road vehicle has a compact structure and better comfort riding comfort.

The off-road vehicle includes a frame, a plurality of wheels, a suspension assembly, a prime mover assembly and a drive train. The plurality of wheels are connected to the frame. The prime mover assembly includes an engine with a cylinder and a power output shaft. The drive train is mounted on the frame. A front drive train includes a front drive shaft transmitting torque from the power output shaft to a front differential. A rear drive train includes a rear drive shaft transmitting torque from the power output shaft to a rear differential. The axis of the cylinder leans upwardly and rearwardly to the cylinder head. The cylinder front line length from the cylinder head mid-point to the front differential rotational output axis is defined as L1, and the cylinder rear line length from the cylinder head mid-point to the rear differential rotational output axis is defined as L2, with a ratio of L1 to L2 being in the range from 0.4 to 1.8.

In one aspect, the driven pulley of a continuously variable transmission ("CVT") powered by the engine is rearward of the CVT drive pulley, with a gearbox below the cylinder head. The layout minimizes heat transmission to the user on the seat, and the center of gravity of the entire vehicle is reasonable and the sitting height is appropriate, thereby making the whole vehicle compact.

It should be noted that the general description above and the detailed description below are only illustrative and cannot limit the disclosure.

The drawings herein are incorporated into the specification and form a portion of this specification, illustrating embodiments in accordance with the disclosure and used together with the specification to explain the principles of the disclosure.

DETAILED DESCRIPTION

For better understanding of the above objects, features and advantages of the present disclosure, the embodiments of the present disclosure will be described in detail below with reference to the accompanying drawings.

It should be noted that the described embodiments are only a portion of the embodiments of this disclosure, and not all of them. However, the present disclosure may be implemented in many other ways different from those described herein, and those skilled in the art can make similar improvements without departing from the teachings of the present disclosure.

The terms used in the embodiments of this disclosure are for the purpose of describing specific embodiments only, and are not intended to limit this disclosure. The singular forms of "one", "said", and "the" used herein are also intended to include the plural forms unless the context clearly indicates other meanings.

It should be noted that the term "and/or" used herein is only a description of the association relationship between related objects, indicating that there can be three types of relationships, such as A and/or B, which can indicate the existence of A alone, the coexistence of A and B, and the existence of B alone. In addition, the character "/" herein generally indicates that the associated objects are an "or" relationship.

Figure 3:
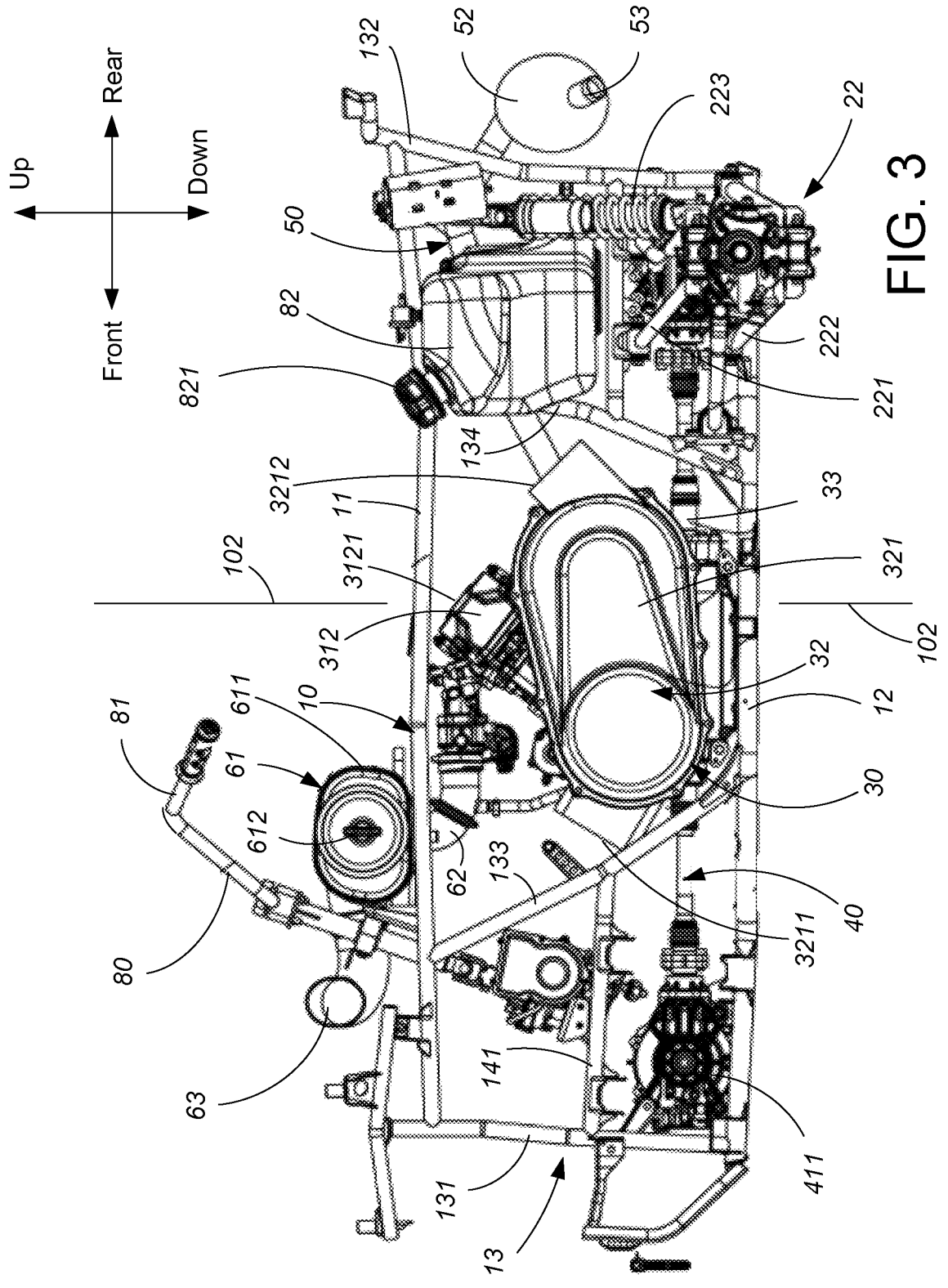
FIG. 3 is a left side view of the off-road vehicle of FIGS. 1 and 2, shown further without the front suspension and instrument panel.
Figure 9:
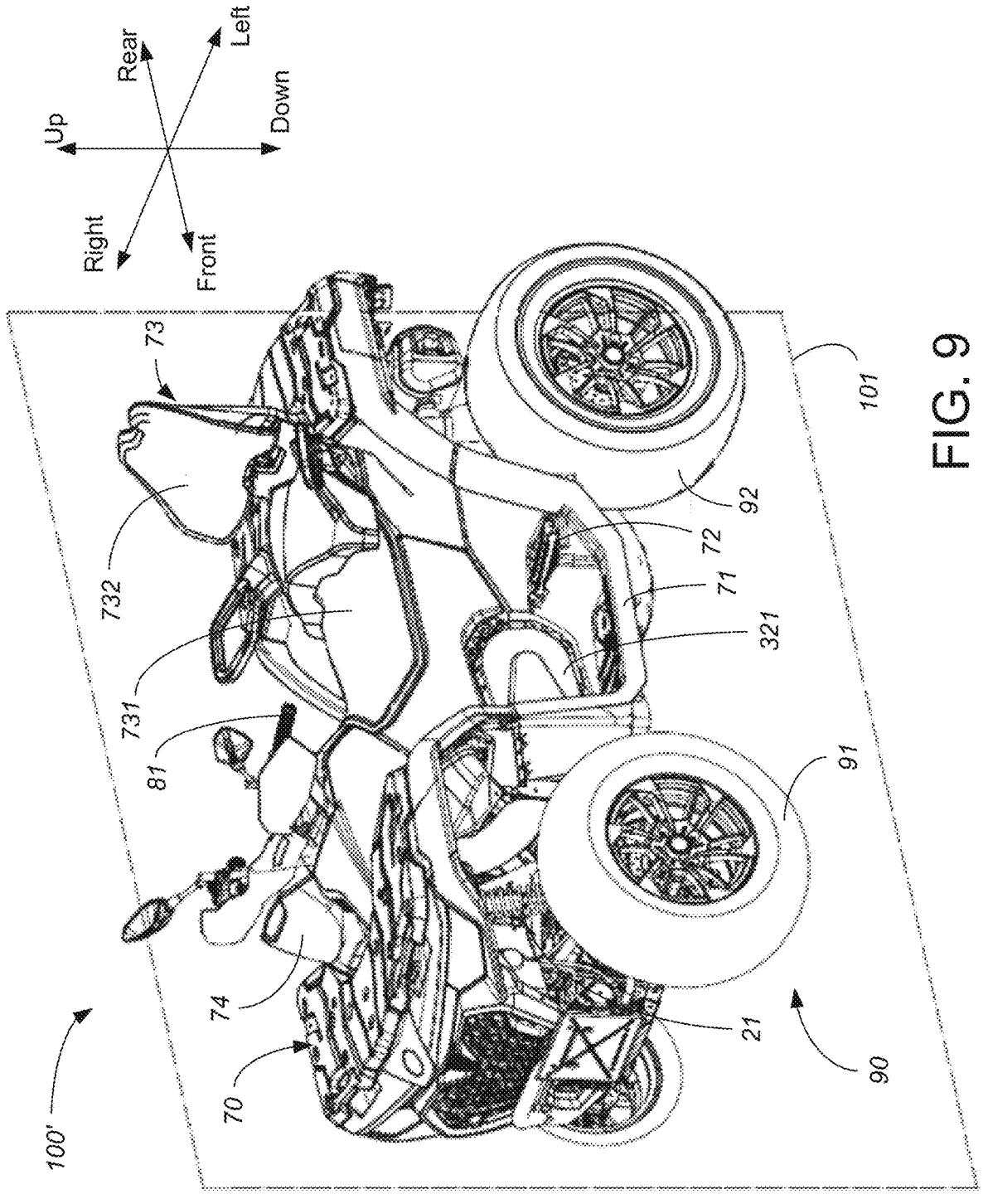
FIG. 9 is a perspective view of an off-road vehicle according to a second preferred embodiment of the disclosure.

The general orientations of front, rear, up (upper), down (lower), left and right for the off-road vehicle 100 are defined in FIGS. 3 and 9 of the drawings. When used herein, the terms "vertical" and "horizontal" assume that the off-road vehicle rests on a horizontal ground surface. Furthermore, in this context, it should be noted that when a component is mentioned to be connected "above" or "below" another component, it can not only be directly connected above or below another component, but can also be indirectly connected above or below another component through intermediate components.

The preferred off-road vehicle 100 includes a frame 10, a suspension system 20, a prime mover assembly 30, a drive train 40, a vehicle cover 70 (labeled only in FIG. 9), and a plurality of wheels 90. The plurality of wheels 90 are connected to the frame 10 and include at least one front wheel 91 and at least one rear wheel 92. The number of wheels 90 may be three or more, with the preferred embodiment having two front wheels 91 and two rear wheels 92. The suspension system 20 includes a front suspension 21 and a rear suspension 22. The front wheel(s) 91 is (are) connected to the frame 10 by the front suspension 21, and the rear wheel(s) 92 is (are) connected to the frame 10 by the rear suspension 22. The drive train 40 is mounted on the frame 10 to transmit the power/torque of the prime mover assembly 30 to the wheels 90. The vehicle cover 70 is supported by and covers at least portions of the frame 10, and a straddle seat 73 and an instrument panel 74 may be considered components of the vehicle cover 70.

As shown in FIGS. 2-5, 7 and 8, the prime mover assembly 30 includes an engine 31 and a transmission 32 preferably including a continuously variable transmission ("CVT") 321 and a gearbox 322 (called out in FIG. 8 and further shown in FIGS. 12 and 13) to transfer power from the engine 31 to a power output shaft 33. The CVT 321 and gearbox 322 may operate substantially as disclosed in U.S. Pat. No. 11,607,947, incorporated by reference. The engine 31 is arranged on the frame 10 and includes an engine body 311 (called out in FIGS. 5-8). The preferred engine 31 is a single cylinder internal combustion engine with a single cylinder head 312 connected toward the top of the engine body 311. The engine body 311 defines a cylinder housing a piston (not separately shown) which reciprocates along a cylinder axis 313. The cylinder head 312 faces towards the rear of the frame 10, i.e., the cylinder axis 313 slopes upwardly and rearwardly. The engine 31 is connected to the power output shaft 33 through the transmission 32. A CVT cooling air inlet 3211 and a CVT cooling air outlet 3212 (both called out in FIGS. 3, 7 and 8) are respectively defined on front and rear ends of the CVT 321.

Figure 7:
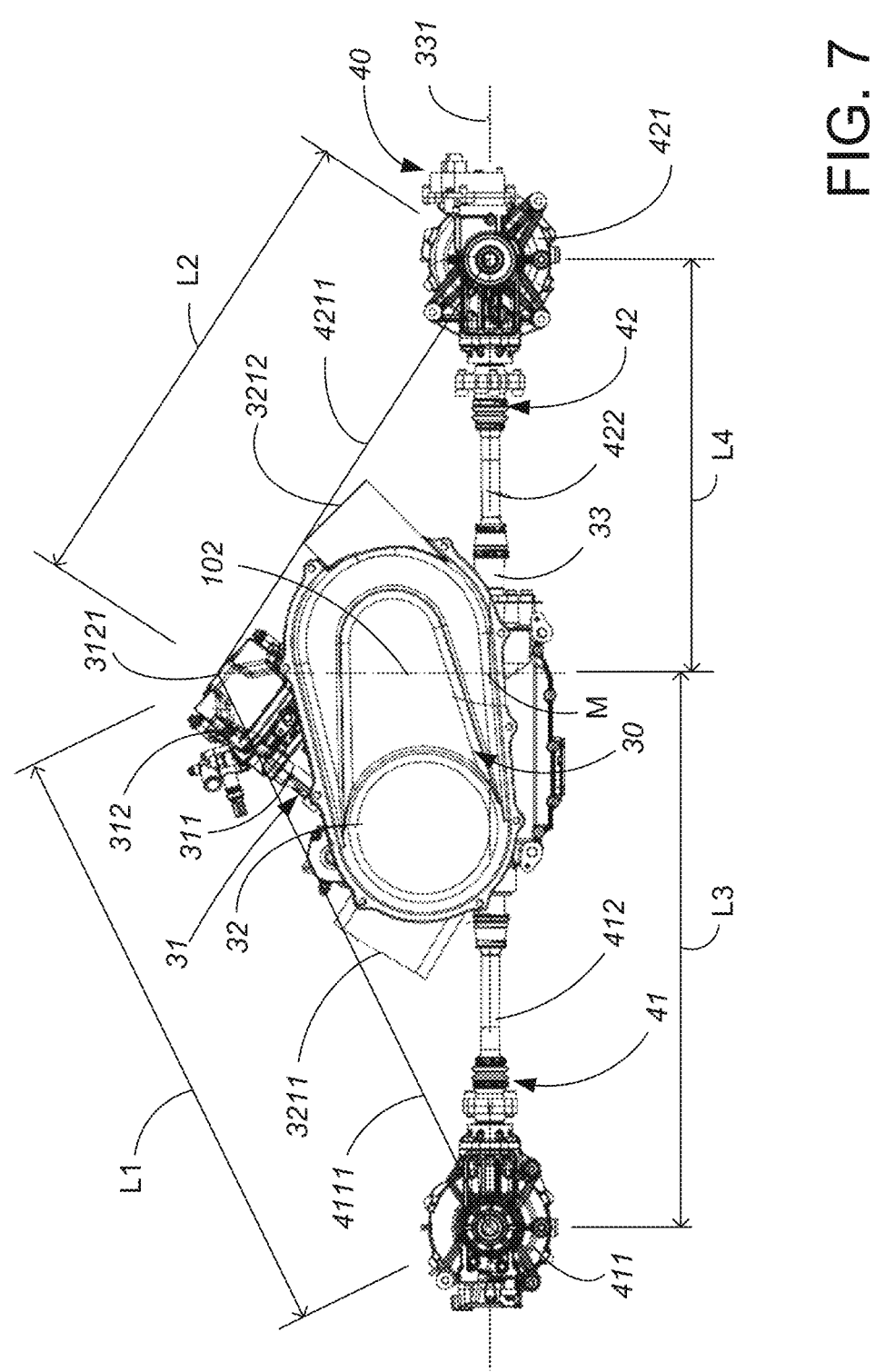
FIG. 7 is a left side view of the prime mover assembly and drive train of the off-road vehicle of FIG. 1.
Figure 8:
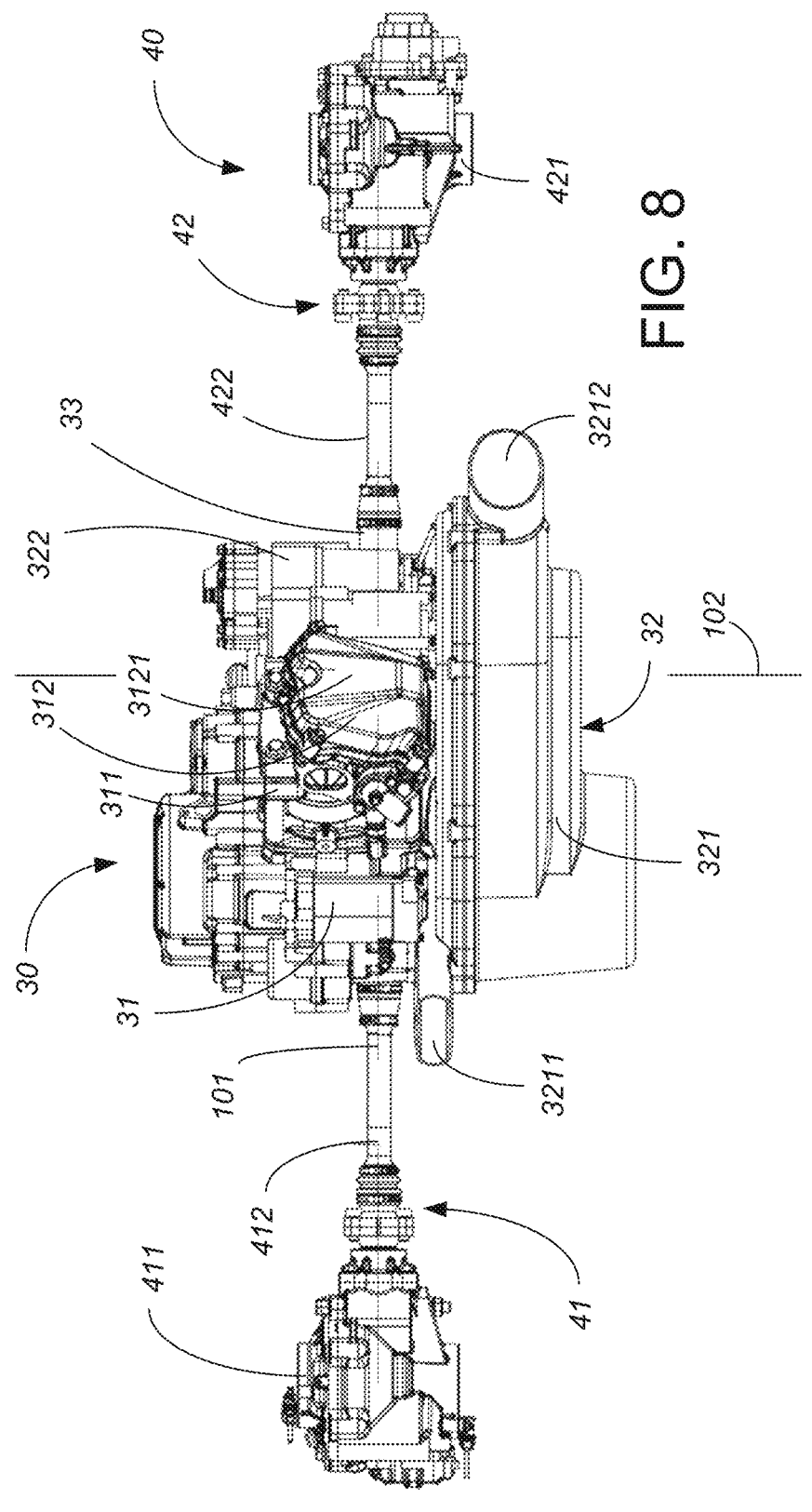
FIG. 8 is a top plan view of the drive train and the prime mover assembly of FIG. 7.

The off-road vehicle 100 is preferably a four wheel drive vehicle, for which the drive train 40 includes a front drive train assembly 41 and a rear drive train assembly 42 as best shown in FIGS. 7 and 8. Alternatively the off-road vehicle 100 could be a two-wheel drive vehicle. The drive train 40 is mounted on the frame 10 to transmit the power from the power output shaft 33 of the prime mover assembly 30 to the wheels 90.

The front drive train 41 includes a front drive shaft 412 delivering power to a front differential 411. The rear drive train 42 includes a rear drive shaft 422 delivering power to a rear differential 421. Both the front drive shaft 412 and the rear drive shaft 422 are connected such as via a splined connection to the power output shaft 33 so as to rotate at the same rotational speed as the power output shaft 33. The front differential 411 transfers rotational power to two front half shafts 413 (shown only in FIG. 2) which in turn cause the two front wheels 91 to rotate. The rear differential 421 transfers rotational power to two rear half shafts 423 (shown only in FIG. 2) which in turn cause the two rear wheels 92 to rotate. The front differential 411 and the rear differential 421 may be similar to any of those taught in U.S. Pat. Nos. 10,788,113, 10,816,071, and 10,830,326, incorporated by reference.

Figure 2:
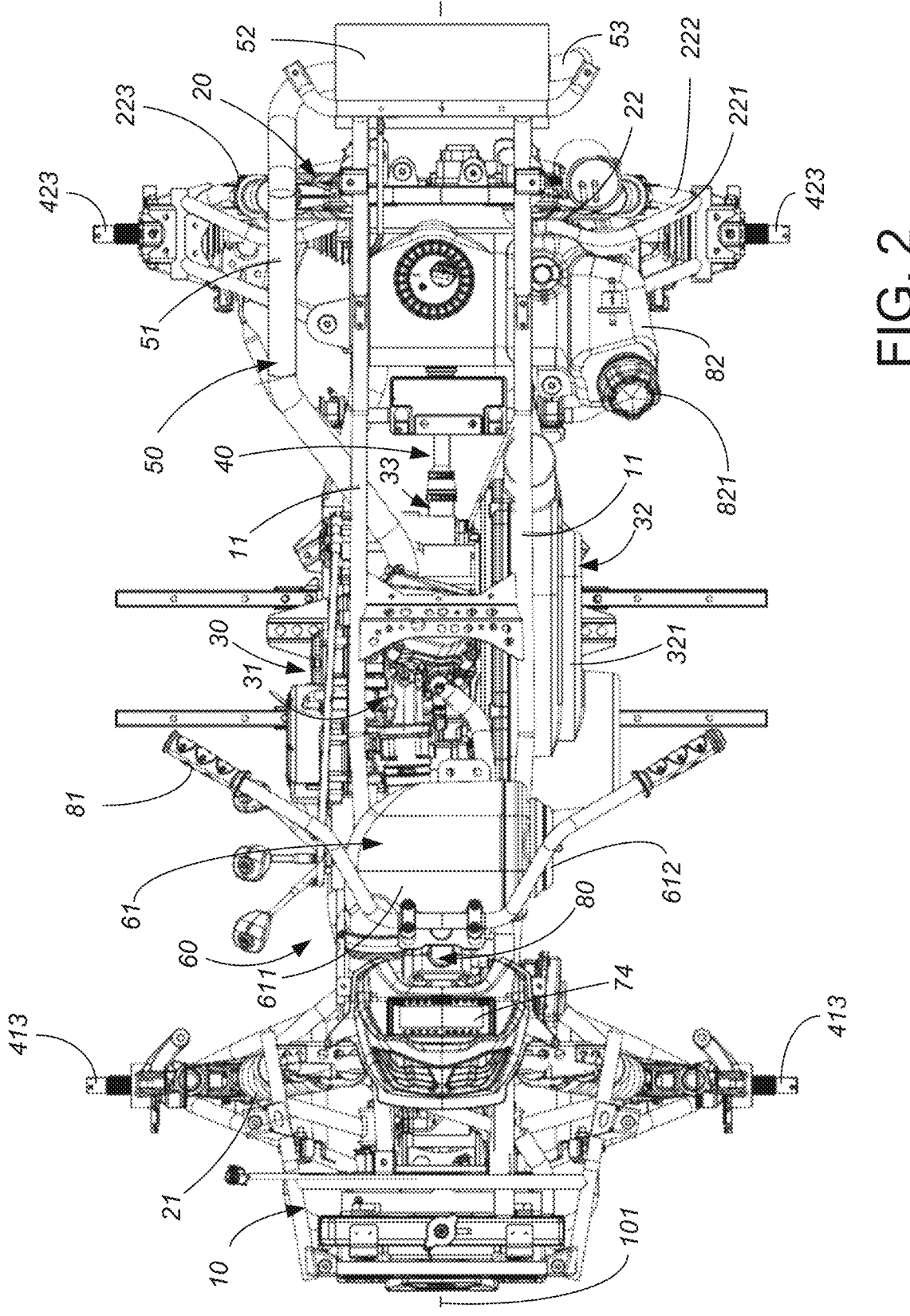
FIG. 2 is a top plan view of the off-road vehicle of FIG. 1, shown without the wheels and seat.
Figure 5:
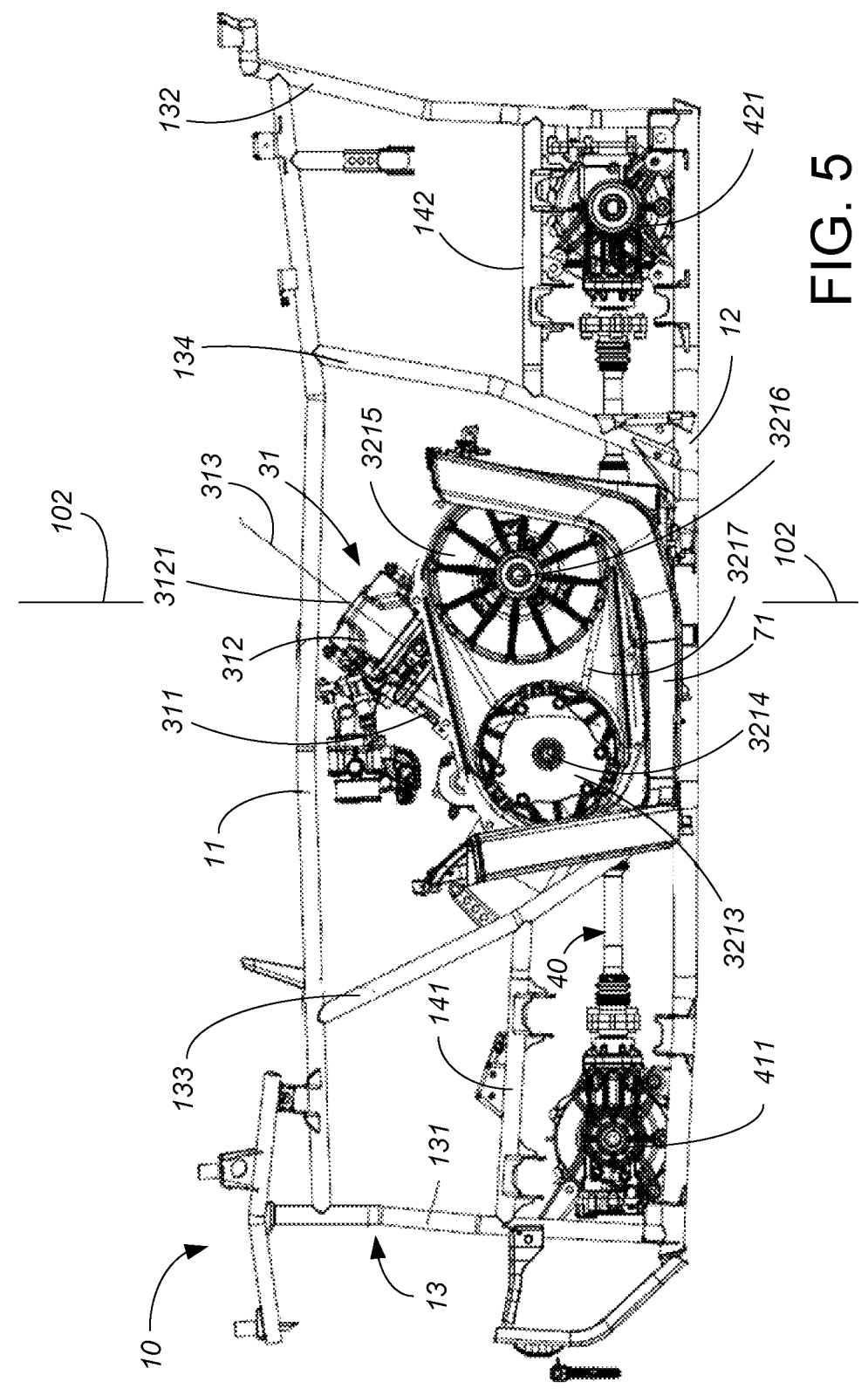
FIG. 5 is a left side view of the frame, prime mover assembly and drive train of the off-road vehicle of FIGS. 1-4, shown further without the CVT cover, but adding a foot plate of the vehicle cover to the drawing.
Figure 6:
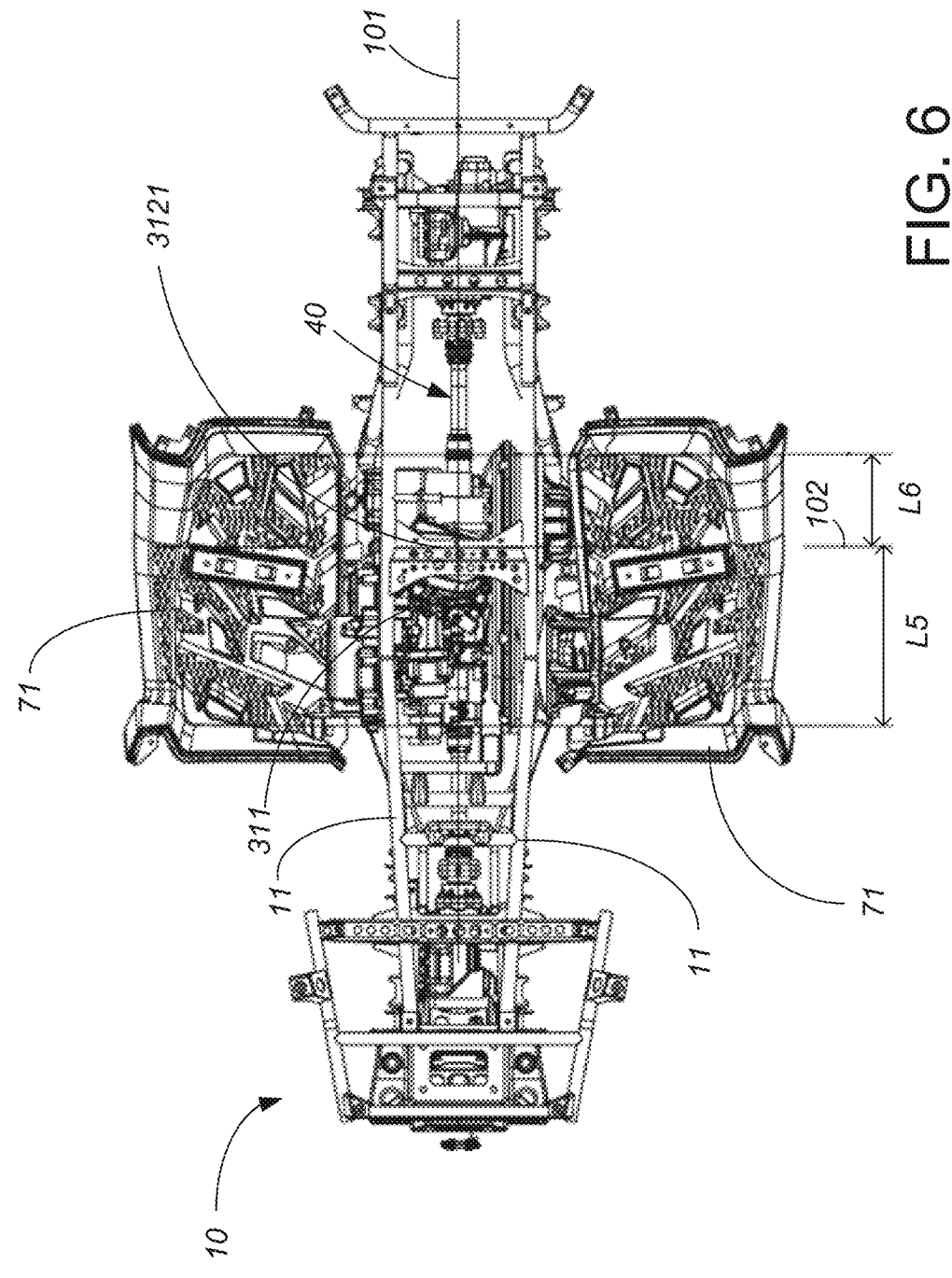
FIG. 6 is a top plan view of the frame, prime mover assembly, drive train and foot plates of FIG. 5.

As best seen in FIGS. 2 and 6, the preferred frame 10 includes two (right and left) upper main beam tubes 11 arranged substantially symmetrically relative to a longitudinal mid-plane 101, with the longitudinal mid-plane 101 being defined as a vertical plane perpendicular to a width direction of the vehicle 100, 100' and where a center line of the vehicle 100, 100' is located. The preferred frame 10 also includes two (right and left) lower main beam tubes 12 arranged substantially symmetrically relative to the longitudinal mid-plane 101. The engine 31 is arranged and supported at an elevation between the upper main beam tubes 11 and the lower main beam tubes 12, largely centered right to left in the vehicle 100. A plurality of vertically extending tubes 13 connect the upper main beam tubes 11 and the lower main beam tubes 12 on both the right and left sides of the vehicle 100. As called out in FIGS. 3 and 5, the vertically extending tubes 13 preferably include two (right and left) front uprights 131 substantially defining a front of the frame 10, two (right and left) rear uprights 132 substantially defining a rear of the frame 10, two (right and left) forward-lean supports 133 between the front uprights 131 and the prime mover assembly 30, and two (right and left) rearward-lean supports 134 between the prime mover assembly 30 and the rear uprights 132. The angles of each of the vertically extending tubes 13 relative to vertical (including whether leaning forwardly or rearwardly) can be adjusted as needed for any particular vehicle layout. Front suspension connection tubes 141 run longitudinally between the forward-lean supports 133 and the corresponding (right and left) front uprights 131. Rear suspension connection tubes 142 run longitudinally between the rearward-lean supports 134 and the corresponding (right and left) rear uprights 132. While the preferred embodiment uses steel welded together for each of these tubular members 11, 12, 131, 132, 133, 134, 141, 142 for ease and strength of assembly of the frame 10, other embodiments use other shapes of members and other connection methods such as bolted connections.

A projection of the prime mover assembly 30 on the longitudinal mid-plane 101 is substantially located within an area enclosed by projections of the forward-lean supports 133, the rearward-lean supports 134, the upper main beam tubes 11 and the lower main beam tubes 12 all on the longitudinal mid-plane 101, allowing the prime mover assembly 30 to be directly removed from one side of the frame 10 without excessive disassembly of frame 10 so as to facilitate the maintenance of engine 31. In an alternative embodiment shown in FIG. 14, the upper main beam tubes 11″ of the frame 10″ define an upwardly arched avoidance portion 110 to give additional clearance which matches the assembly of prime mover assembly 30 into the vehicle 100, allowing the prime mover assembly 30 to be directly removed or inserted from one side of the frame 10″.

As shown in FIGS. 1-4 and 9, the off-road vehicle 100 further includes a steering assembly 80 mounted on the frame 10 to control the steering of the vehicle 100. Steering of the front wheels 91 is implemented by the steering assembly 80. The preferred steering assembly for a straddle-type vehicle 100, 100′ includes handlebars 81. The steering assembly 80 preferably extends downwardly from the handlebars 81 between the two upper main beam tubes 11 at a location adjacent to where the forward-lean supports 133 connect to the two upper main beam tubes 11.

The off-road vehicle 100 further includes an exhaust assembly 50 and an intake assembly 60. The exhaust assembly 50 is connected to the cylinder head 312 of the engine 31 for exhausting the exhaust gas expelled by the engine 31. The exhaust assembly 50 includes an exhaust pipe 51 leading to a muffler 52, before discharging gases out a tailpipe 53. The exhaust pipe 51 is substantially arranged on the other side of the longitudinal mid-plane 101 from the CVT 321. The muffler 52 is located behind the rear uprights 132 at an elevation which is not only lower than the upper main beam tubes 12 but also lower than a cylinder head mid-point 3121, putting the tailpipe 53 in a location which prevents hot exhaust gases from affecting the rear wheels 92 and ensuring the exhaust performance of exhaust assembly 50.

The intake assembly 60 includes an air filter 61 for filtering air delivered through an air intake pipe 62 to the engine 31 for combustion. The air filter 61 receives air through an air inlet 63. In the preferred embodiment, projections of both the air inlet 63 and the air filter 61 on the longitudinal mid-plane 101 are above projections of the upper main beam tubes 11 on the longitudinal mid-plane 101. The preferred air inlet 63 opens toward the left side of the vehicle 100, just in front of the steering assembly 80 and the air filter 61.

The preferred air filter 61 includes a housing 611 with a removable and replaceable filter element (not shown) within the housing 611. The air filter housing 611 is attached to and supported by the frame 10, but includes an air filter housing door/cover 612 which preferably can be detached/removed from and/or moved relative to the rest of the housing 611 by hand and/or without the use of tools. The air filter 61 can be opened through the air filter housing door/cover 612 to replace the filter element. The air filter housing door/cover 612 is preferably exposed on a side of the air filter 61 and through the vehicle cover 70 (not shown in FIGS. 1-4 and not shown for this embodiment) that faces towards the outside of the off-road vehicle 100 and is exposed outside the vehicle cover. Therefore, when the filter element needs to be replaced, users do not need to remove the air filter 61 or disassembly any part of the vehicle cover 70. A user can directly remove and replace the filter element, when standing on the left side of the vehicle 100 and without requiring any tools, through the air filter housing door/cover 612.

A fuel tank 82 is included on the vehicle 100 for storing liquid internal combustion fuel such as gasoline or petrol. In the preferred embodiment, the fuel tank 82 is supported by the two rear suspension connection tubes 142. A projection of the fuel tank 82 on the longitudinal mid-plane 101 is substantially located within an area enclosed by projections of the rearward-lean supports 134, the upper main beam tubes 11, the rear uprights 132 and the rear suspension connection tubes 15 all on the longitudinal mid-plane 101. The fuel tank 82 is located above the rear suspension 22. Both the rear suspension 22 and the fuel tank 82 are connected by the suspension connection tube 15, thereby resulting in a compact layout of the frame 10. The fuel tank 82 includes a filler neck 821, which is preferably on the opposite side of the longitudinal mid-plane 101 from the exhaust pipe 51, helping to reduce the likelihood of fuel spills onto the hot exhaust pipe 51.

The preferred rear suspension 22 includes two (right and left) upper rocker arms 221, two (right and left) lower rocker arms 222, and two (right and left) rear shock absorbers 223. A portion of the fuel tank 82 preferably extends between the two rear shock absorbers 223, i.e., projections of the fuel tank 82 and the rear shock absorbers 223 on the longitudinal mid-plane 101 at least partially overlap, such that the fuel tank 82 is not fully shown in FIG. 3. Similarly, a portion of the fuel tank 82 preferably extends between the two rear wheels 92, i.e., projections of the fuel tank 82 and the rear wheels 92 on the longitudinal mid-plane 101 at least partially overlap, such that the fuel tank 82 is not fully shown in FIG. 1.

Figure 4:
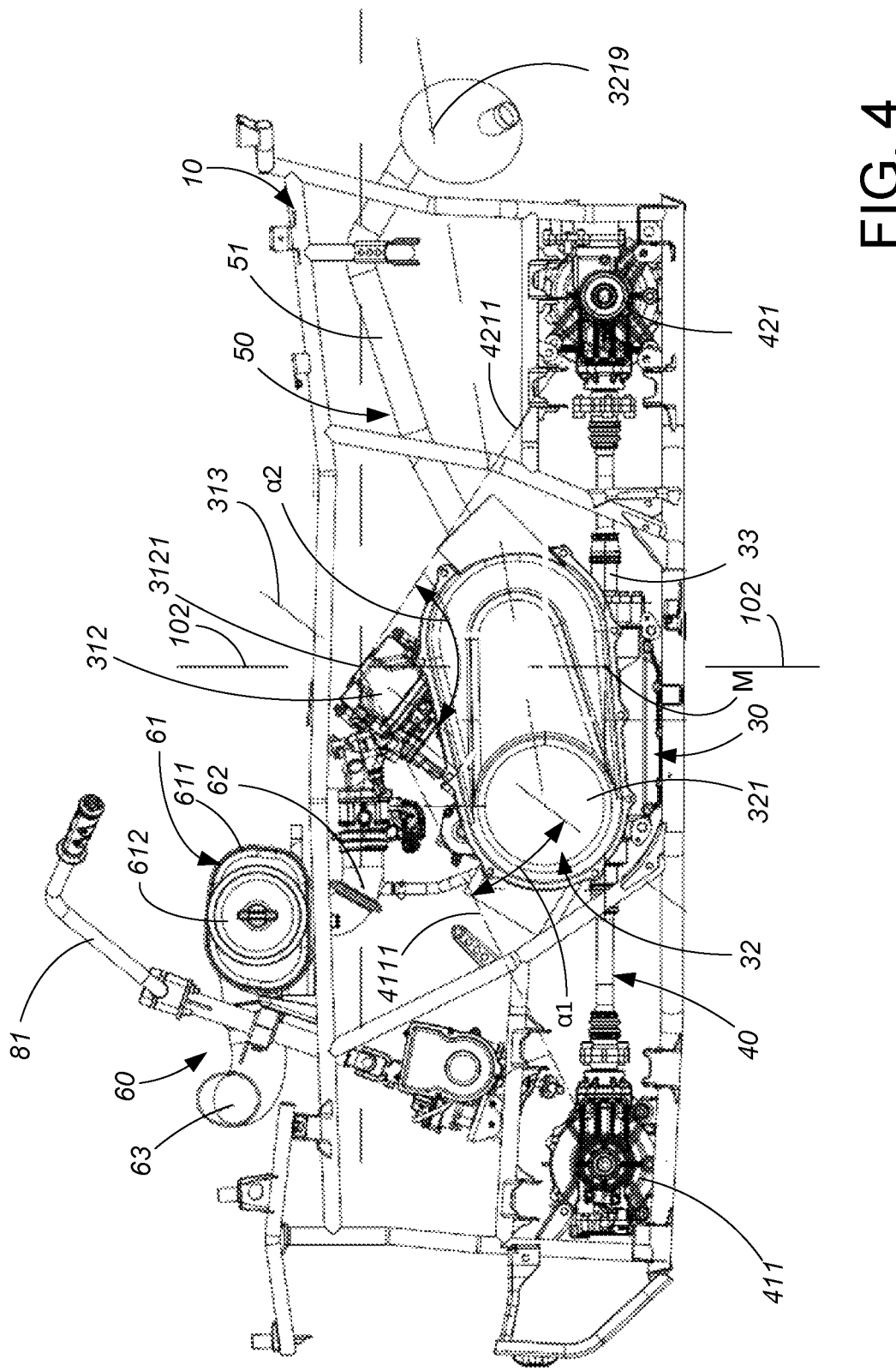
FIG. 4 is a left side view of the off-road vehicle of FIGS. 1-3, shown further without the fuel tank or rear suspension.
Figure 10:
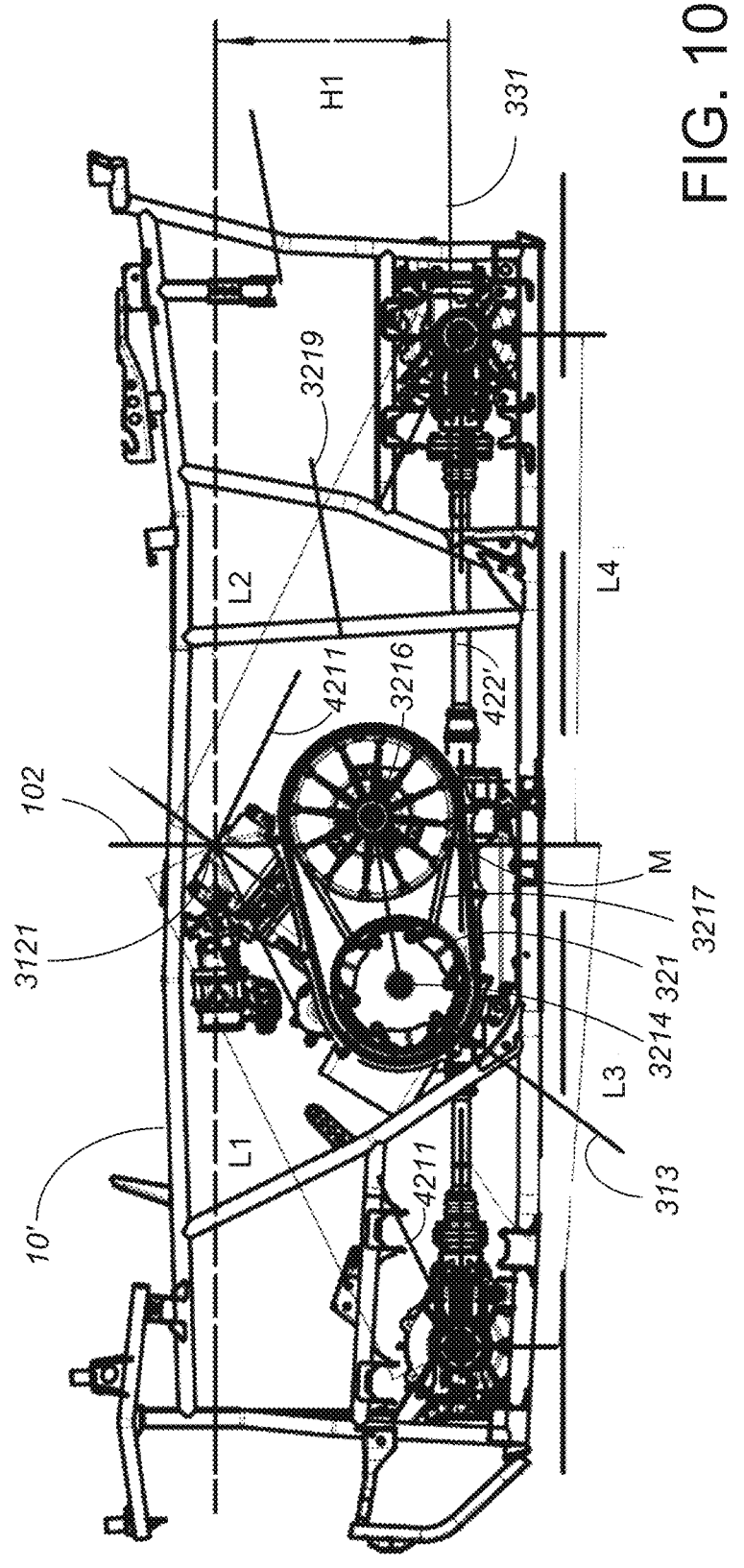
FIG. 10 is a left side view of the frame, prime mover assembly and drive train of the off-road vehicle of FIG. 9, shown without the CVT cover.
Figure 11:
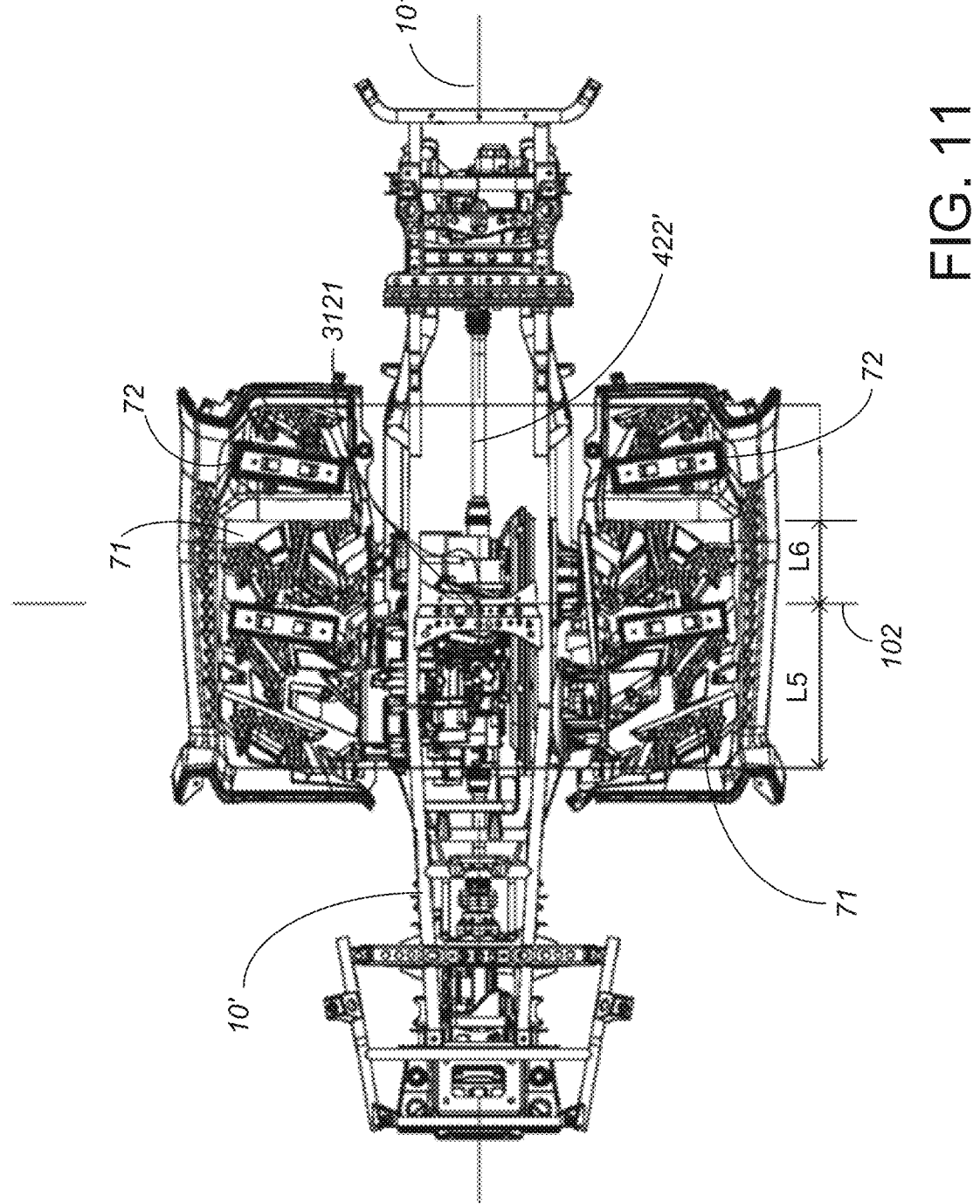
FIG. 11 is a top plan view of the frame, prime mover assembly and drive train of FIG. 10, further adding foot plates.

FIGS. 4 and 7 show several additional features which result from the preferred layout of the vehicle 100 and prime mover assembly 30. A cylinder head mid-point 3121 is defined as the point where the cylinder axis 313 hits the exterior surface of the cylinder head 312. A cylinder cross-plane 102 is defined as a vertical plane extending in the transverse (right-left) direction through the cylinder head mid-point 3121. A cylinder front line 4111 is defined as a straight line running from the output rotational axis of the front differential 411 to the cylinder head mid-point 3121. A cylinder rear line 4211 is defined as a straight line running from the output rotational axis of the rear differential 421 and the cylinder head mid-point 3121. A ratio of the length L1 (called out in FIGS. 7 and 10) of the cylinder front line 4111 to the length L2 (called out in FIGS. 7 and 10) of the cylinder rear line 4211 is preferably in the range from 0.4 to 1.8, more preferably in the range from 0.6 to 1.5, even more preferably in the range from greater than 1 to 1.5, and most preferably in the range from 1.2 to 1.3. These preferred ranges of ratios of lengths L1/L2 of cylinder front and rear lines 4111/4211 keep the weight of the engine 31 centered between the wheels 90, for best location of the center of gravity of the vehicle 100 in the front-rear direction and for improved stability of the vehicle 100. As called out in FIG. 4, a cylinder front angle α1 is defined between the cylinder axis 313 and the cylinder front line 4111, and a cylinder rear angle α2 is defined between cylinder axis 313 and the cylinder rear line 4211. A ratio of the cylinder front angle α1 to the cylinder rear angle α2 is preferably in the range from 0.15 to 0.4 and more preferably in the range from 0.22 to 0.34. These low values reflect the rearward and upward slope of the cylinder axis 313. For instance, one preferred embodiment places the rearward and upward slope of the cylinder axis 313 at about 53° above horizontal, places the cylinder front line 4111 at a rearward and upward slope of about 26° above horizontal, and places the cylinder rear line 4211 at a forward and upward slope of about 33° above horizontal, so the cylinder front angle α1 is about 27°, the cylinder rear angle α2 is about 94° and the ratio of the cylinder front angle α1 to the cylinder rear angle α2 is about 0.29.

A power output line 331 is defined as a straight line running from the output rotational axis of the front differential 411 to the output rotational axis of the rear differential 421. A point M is defined as a point where the cylinder cross-plane 102 intersects with the power output line 331, i.e. generally the point on the power output line 331 which is closest to the cylinder head mid-point 3121. A front power output line distance L3 (called out in FIGS. 7 and 10) is defined is the length of the power output line 331 which is in front of point M, and a rear power output line distance L4 (called out in FIG. 9) is defined as the length of the power output line 331 which is behind point M. A ratio of the front power output line distance L3 to the rear power output line distance L4 is preferably in the range from 0.9 to 1.5, and more preferably in the range from 1.2 to 1.3.

A vertical distance of the cylinder head midpoint 3121 over the power output line 331 is defined as a cylinder head clearance height H1, and a ratio of the cylinder head clearance height H1 to the rear power output line distance L4 is preferably in the range from 0.4 to 0.78, and more preferably is in the range from 0.52 to 0.78. The overall height of the engine 31 is reduced, making it easier to assemble the prime mover assembly 30 into the frame 10, and ensuring that the straddle seat 73 has better driving comfort without overly increasing the overall height of the vehicle 100, 100'.

As shown in FIG. 5, the CVT 321 includes a drive pulley 3213 with drive pulley rotation axis 3214 and a driven pulley 3215 with a driven pulley rotation axis 3216. In the preferred embodiment, the CVT 321 is oriented such that both the drive pulley rotation axis 3214 and the driven pulley rotation axis 3216 extend horizontally in the transverse (right-left) direction. The driven pulley 3215 is preferably disposed rearwardly of the drive pulley 3213, and the drive pulley rotation axis 3214 preferably intersects the cylinder axis 313. The combined orientation of the CVT 321 and the engine body 311 make it such that the driven pulley rotation axis 3216 is closer than the drive pulley rotation axis 3214 to a transverse vertical plane through the cylinder head mid-point 3121 (the cylinder cross-plane 102), such as having the cylinder head mid-point 3121 nearly vertically over the driven pulley rotation axis 3216. In the preferred embodiment, the driven pulley rotation axis 3216 is just behind the cylinder cross-plane 102, best shown in FIGS. 5 and 10. At the same time, due to the rearward slope of the cylinder axis 313, the drive pulley rotation axis 3214 is well in front of the cylinder cross-plane 102. A ratio of distances from the cylinder cross-plane 102 rearward to the driven pulley rotation axis 3216 and forward to the drive pulley rotation axis 3214 is preferably greater than 3, more preferably greater than 4 and most preferably in the range from 4 to 6. These high ratios assure that the driven pulley rotation axis 3216 is substantially closer to the cylinder head mid-point 3121 than the distance from the drive pulley rotation axis 3214 to the cylinder head mid-point 3121, opposite the layout of many single cylinder engines and CVTs of the prior art.

Figure 14:
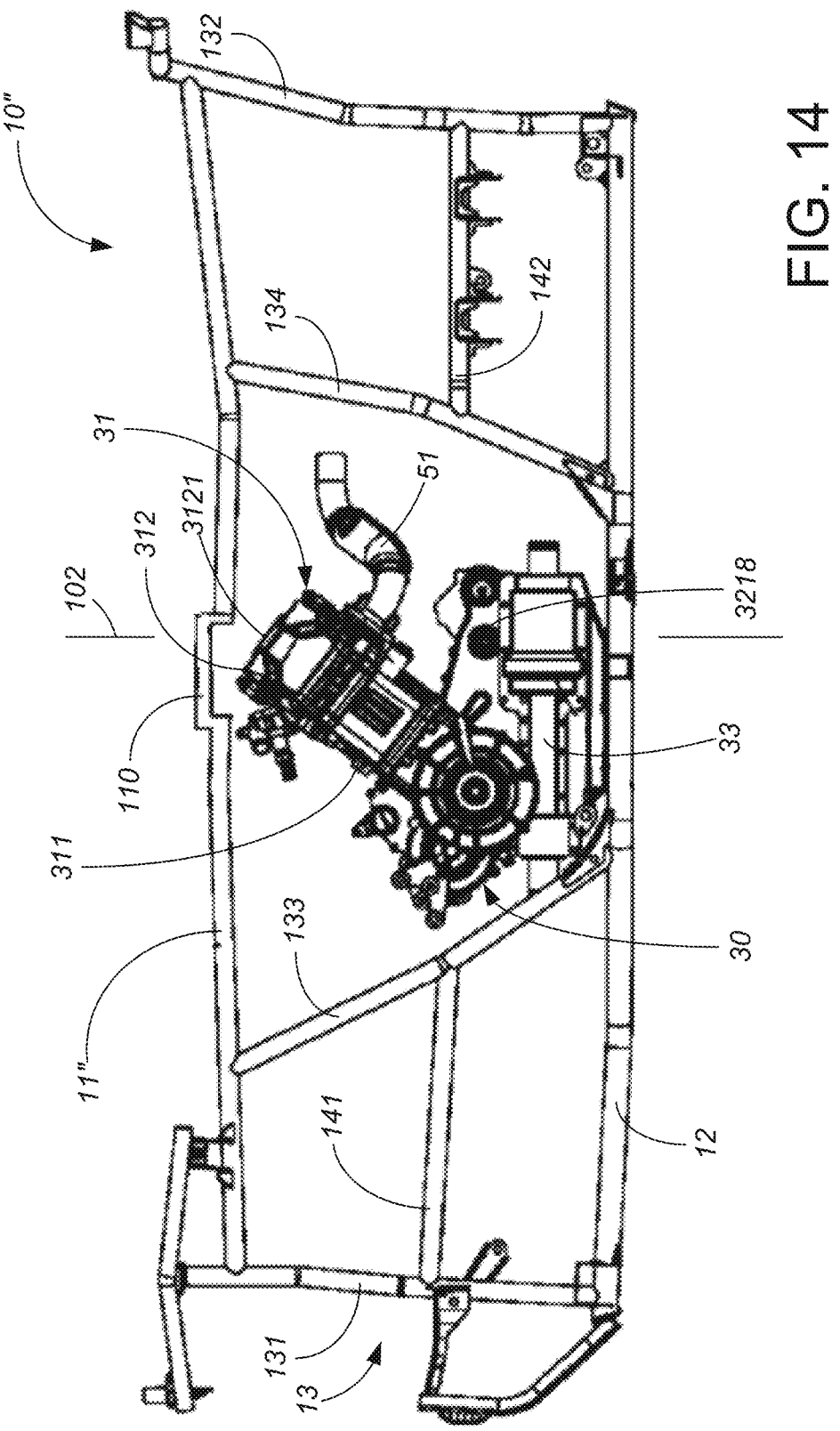
FIG. 14 is a left side view of a frame and prime mover assembly of an off-road vehicle according to a third preferred embodiment of the disclosure.

The drive pulley 3213 drives the driven pulley 3215 via a CVT belt 3217 (shown in FIGS. 5 and 10) having a CVT belt tensioner 3218 (shown only in FIG. 14). A projection of a straight line connecting the drive pulley rotation axis 3214 and the driven pulley rotation axis 3216 is defined as a CVT centerline 3219. The CVT belt tensioner 3218 is preferably located such that a projection of the CVT centerline 3219 is between a projection of the CVT belt tensioner 3218 and a projection of the cylinder axis 313 all on the vehicle longitudinal mid-plane 101. That is, in the configuration shown wherein the CVT centerline 3219 is nearly horizontal, the CVT belt tensioner 3218 is below the CVT centerline 3219. This preferred layout arrangement of prime mover assembly 30 allows cylinder head 312 to be far away from the CVT belt tensioner 3218. The material of the CVT belt 3217 is generally rubber, and parts of the CVT belt tensioner 3218 can also be rubber, and the preferred layout arrangement of prime mover assembly 30 can help minimize degradation of the CVT belt 3217 and CVT belt tensioner 3218 due to heat given off by the cylinder head 312.

In the preferred embodiment, the power output shaft 33, the front drive shaft 412, and the rear drive shaft 422 are arranged coaxially, which eliminates the need for a universal or constant velocity joint to connect the front drive shaft 412 and/or the rear drive shaft 422 to the power output shaft 33, thereby improving transmission efficiency. More preferably, the power output shaft 33, the front drive shaft 412, and the rear drive shaft 422 are all located on the longitudinal center plane 101, so that the vehicle 100, 100' is substantially symmetric relative to the longitudinal center plane 101, which can save mold costs and improves the stability of the off-road vehicle 100, 100'. In other embodiments, one or more of the power output shaft 33, the front drive shaft 412, and the rear drive shaft 422 may be offset from the longitudinal center plane 101 or may not be coaxially arranged.

The distance from the power output line 331 to the ground surface (elevation of the power output line 331) depends significantly on wheel diameter, and in a preferred embodiment increases slightly from front to rear along the length direction of the vehicle 100, 100'. An angle defined between the power output line 331 and a ground surface/horizontal is preferably in the range from 0 degree to 15 degrees, and more preferably less than 1°. This allows a relatively consistent ground clearance under the vehicle 100, 100' to avoid interfering with obstacles on the ground, while still leaving the engine 31 and its cylinder head 312 low enough to fit under the seat 73.

Figure 1:
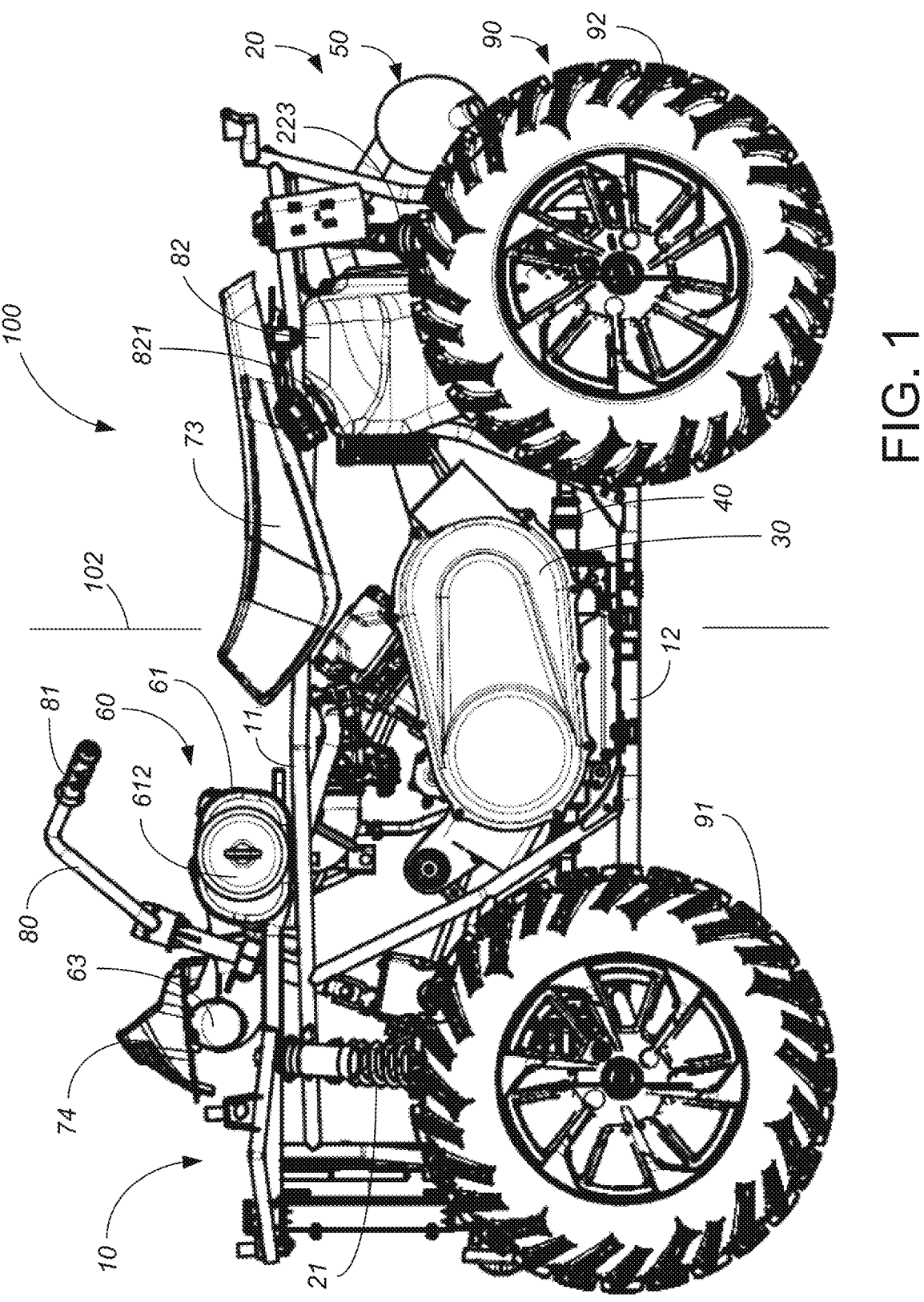
FIG. 1 is a left side view of an off-road vehicle according to a first embodiment of the disclosure, shown without the majority of the vehicle cover.

The preferred embodiment shown in FIG. 1 includes a single straddle seat 73 to be used both for the driver and for any passenger. FIG. 9 shows an alternative off-road vehicle 100' having a separate seating area 732 for a passenger as compared to a driver seating area 731. The passenger seating area 732 is preferably at a higher elevation than the driver seating area 731.

The vehicle cover 70 preferably includes right and left foot plates 71 shown in FIGS. 5, 6, 9 and 11. The right and left foot plates 71 are preferably arranged to be generally symmetric with respective to the longitudinal mid-plane 101. The cylinder cross-plane 102 intersects the two foot plates 71, so the foot plates 71 have a length which can be split into a front foot plate length L5 in front of the cylinder head mid-point 3121 and rear foot plate length L6 behind the cylinder head mid-point 3121. A ratio of the front foot plate length L5 to the rear foot plate length L6 is preferably in the range from 0.5 to 4.0, and more preferably in the range from 1.0 to 2.0, and most preferably in the range from 1.5 to 2.0. With this arrangement, the space above the foot plates 71 can be used to disassemble the entire prime mover assembly 30 along the vehicle width direction, thereby making it easier to repair and/or replace the prime mover assembly 30. In vehicles 100' with a separate passenger seating area 732 at an elevation above the driver seating area 731, right and left passenger foot plates 72 can be provided behind and higher than the driver foot plates 71. The existence of passenger foot plates 72 does not affect the preferred ratios of front foot plate length L5 to rear foot plate length L6 of the driver foot plates 71. Extra length added to the vehicle 100' for more comfortable passenger seating is largely added behind the prime mover assembly 30, with an increased length of rear drive shaft 422'.

Figure 12:
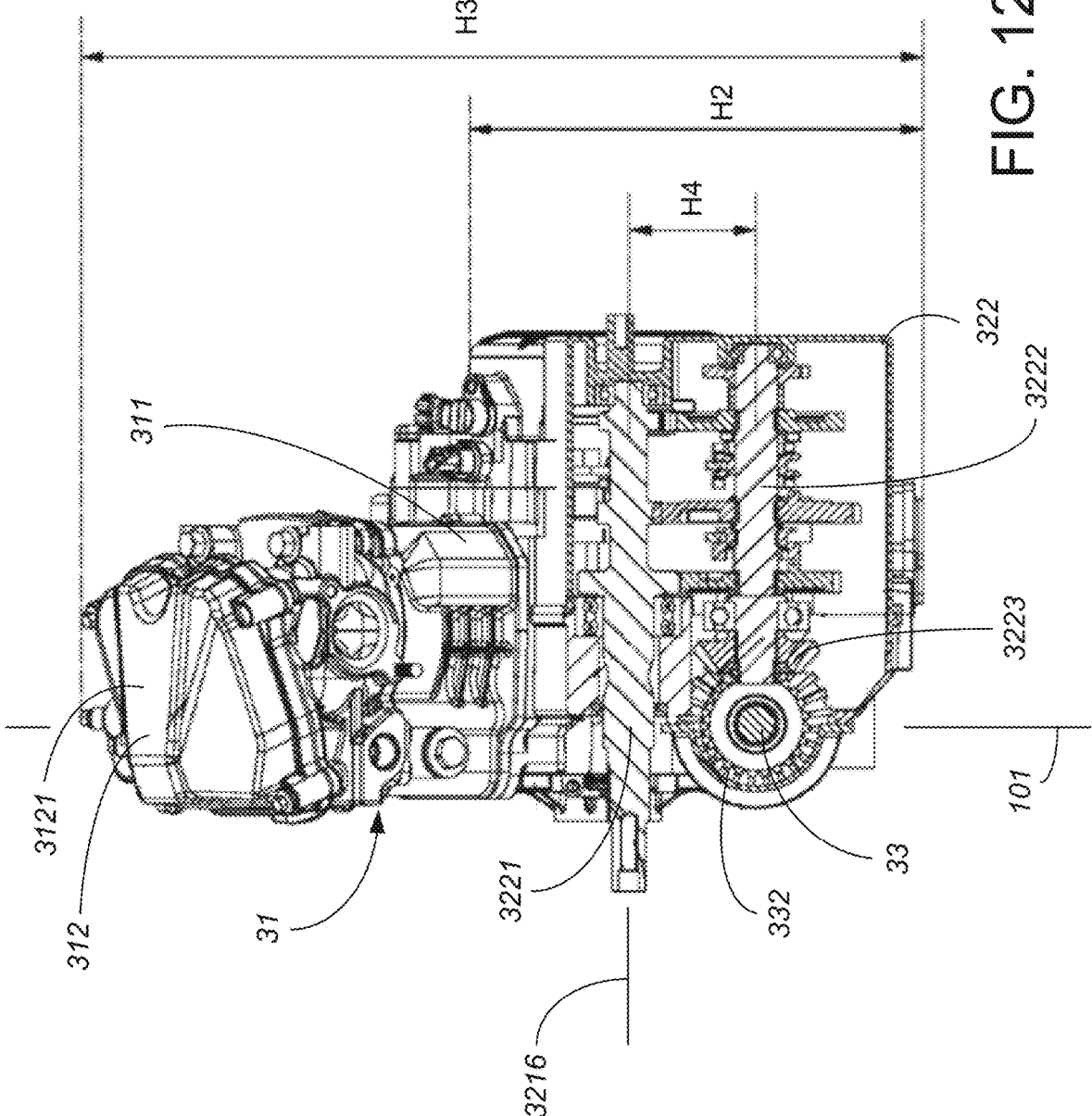
FIG. 12 is a rear elevational view of the engine, gear box and power output shaft of either of the preferred vehicles of FIGS. 1 and 9, in partial cross-section through the gearbox gear shafts.
Figure 13:
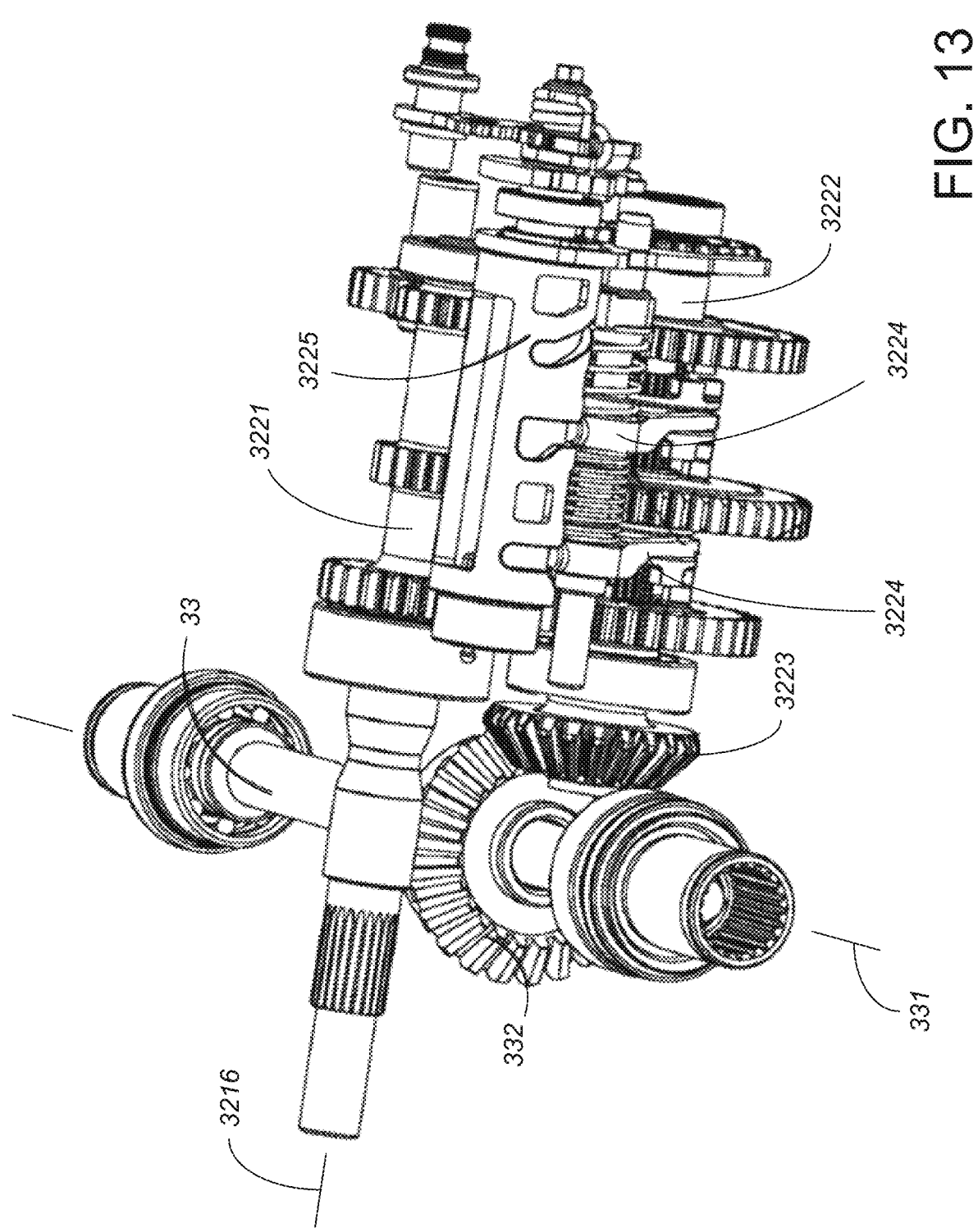
FIG. 13 is a rear perspective view of the gearbox gear shafts, shift drum, shift forks and power output shaft of the gearbox and power output shaft of FIG. 12.

The preferred layout of the gearbox 322 relative to the power output shaft 33 is shown in FIGS. 12 and 13. Except as to layout as described herein, the gear box 322 and gears therein may be substantially as taught in U.S. Pat. Nos.

11,287,036 and 11,578,792, incorporated by reference. The gearbox 322 is substantially on the opposite side of the longitudinal mid-plane 101 from the CVT 321. The gearbox 322 includes a main drive gear shaft 3221 and a secondary driven gear shaft 3222 connected to each other by meshing gears to control the gear switching (such as forward L, forward H, Neutral and Reverse) of the off-road vehicle 100. The main drive gear shaft 3221 is rotationally driven by the driven pulley 3215 of the CVT 321, and is preferably coaxial with the driven pulley rotation axis 3216 of the CVT 321. The secondary driven gear shaft 3222 is fitted with an output bevel gear 3223 meshing with the power output shaft 33 to transmit torque in a transmission mode. The axis of the secondary driven gear shaft 3222 is substantially parallel to the axis of the main drive gear shaft 3221 and is substantially perpendicular to the axis of the power output shaft 33, i.e., both the main drive gear shaft 3221 and the secondary driven gear shaft 3222 extend in the transverse direction. In the upper-lower direction of the off-road vehicle 100, the main drive gear shaft 3221 is at least partially above the secondary driven gear shaft 3222. The main drive gear shaft 3221 is at least partially above the power output shaft 33. In the left-right vehicle direction, the output bevel gear 3223 is preferably arranged near the longitudinal mid-plane 101, i.e., on the left side of the secondary driven gear shaft 3222 as shown. The power output shaft 33 is at least partially located on the left side of the output bevel gear 3223. Thus, the secondary driven gear shaft 3222 drives the power output shaft 33 through the output bevel gear 3223 in a transmission mode. Both the main drive gear shaft 3221 and the secondary driven gear shaft 3222 occupy space at least partially below the cylinder head 312. The arrangement of the gearbox 322 relative to the engine 31 thereby reduces the space occupied by the gearbox 322, making the structure more compact, and improving the space utilization rate of the off-road vehicle 100, 100'.

As shown in FIG. 12, the gearbox 322 has an overall gearbox height H2 and the prime mover assembly 30 has an overall engine height H3. A ratio of gearbox height H2 to overall engine height H3 is preferably in the range from 0.2 to 0.5, more preferably in the range from 0.26 to 0.41, and most preferably in the range from 0.30 to 0.37, with the most preferred ratio value being 0.34.

A shaft offset height H4 is defined as a vertical distance between the main drive gear shaft 3221 and the secondary driven gear shaft 3222. A ratio of the shaft offset height H4 to the engine height H3 is preferably in the range from 0.1 to 0.2, more preferably in the range from 0.12 to 0.19, and most preferably in the range from 0.13 to 0.17, with the most preferred ratio value being 0.15. These height ratios avoid having the gearbox 322 occupying too much space in the prime mover assembly 30, thereby improving the space utilization rate of off-road vehicle 100, 100' and can also avoid reducing the transmission efficiency of gearbox 322.

When viewed from the side of the vehicle 100, the secondary driven gear shaft 3222 and the power output shaft 33 at least partially overlap. The secondary driven gear shaft 3222 extends substantially in the vehicle left-right (transverse) direction, while the power output shaft 33 extends substantially in the vehicle front-rear (longitudinal) direction. That is to say, the axis of the secondary driven gear shaft 3222 is substantially perpendicular to the axis of the power output shaft 33. The axis of secondary driven gear shaft 3222 and the axis of the power output shaft 33 are in the same horizontal plane. This makes the structure between the secondary driven gear shaft 3222 and the power output shaft 33 more compact, which is conducive to improving the structural compactness of the gearbox 322.

The power output shaft 33 is fitted with an input bevel gear 332 meshed with the output bevel gear 3223, and the input bevel gear 332 is at least partially arranged in front of the secondary driven gear shaft 3222. This can avoid increasing the height of the prime mover assembly 30, improving structural compactness and space utilization on the off-road vehicle 100, 100'.

As shown in FIG. 13, the preferred gearbox 322 further includes one or more shift forks 3224 and a shift drum 3225. The shift drum 3225 rotates to move the shift fork(s) 3224 laterally, thereby moving gears laterally to control the transmission ratio and/or rotational direction between the main drive gear shaft 3221 and the secondary driven gear shaft 3222. The shift drum 3225 and the shift fork(s) 3224 are both at least partially located behind the main drive gear shaft 3221, while the shift drum 3225 and the shift fork 3224 are at least partially located above the secondary driven gear shaft 3222. Locating the shift fork 3224 behind the main drive gear shaft 3221 helps minimize the height of the gearbox 322, which can avoid interference with the cylinder head 312 thereby improving the structural compactness and working stability of the engine 31. In addition, locating the shift drum 3225 and the shift fork 3224 above the secondary driven gear shaft 3222 is beneficial for the operation of the shift fork 3224, making it easier for the shift fork 3224 to control the gear switching between the main drive gear shaft 3221 and the secondary driven gear shaft 3222.

In the preferred embodiment, the shift drum 3225 is at least partially above the shift fork 3224. All of a) the axis of the shift drum 3225, b) the movement direction of the shift fork 3224, c) the axis of the secondary driven gear shaft 3222, and d) the axis of the main drive gear shaft 3221 are substantially parallel. The shift drum 3225, the shift fork 3224, the secondary driven gear shaft 3222, and main drive gear shaft 3221 all extend transversely in the vehicle 100 in the left-right direction, improving the structural compactness of the gearbox 322.

It should be noted that the specific embodiments described herein are used to illustrate this disclosure, not to limit the disclosure. It should be noted that for those skilled in the art, without departing from the concept of the disclosure, several modifications and improvements may be made, which all belong to the scope of the disclosure.

The invention claimed is:

1. An off-road vehicle, comprising:

a frame;

a plurality of wheels, the plurality of wheels comprising at least one front wheel and at least one rear wheel;

a suspension assembly comprising a front suspension and a rear suspension, the front wheel being connected to the frame by the front suspension, and the rear wheel being connected to the frame by the rear suspension;

a prime mover assembly comprising an engine and a transmission, the engine being arranged on the frame and comprising an engine body and a cylinder head connected to the engine body, the engine body defining a cylinder axis which slants upwardly and rearwardly, the cylinder head having a cylinder head mid-point where the cylinder axis intersects an exterior surface of the cylinder head;

an exhaust assembly connected to the cylinder head for exhausting exhaust gas expelled by the engine, the exhaust assembly including an exhaust pipe, a muffler and a tailpipe, with the exhaust pipe running between the cylinder head and the muffler and with the tailpipe expelling exhaust gas from the muffler;

a drive train mounted on the frame, the drive train comprising:

a front drive train connected to the front wheel, the front drive train comprising a front drive shaft and a front differential having a front differential output axis; and a rear drive train connected to the rear wheel, the rear drive train comprising a rear drive shaft and a rear differential having a rear differential output axis;

wherein a longitudinal mid-plane is defined as a plane perpendicular to a width direction of the vehicle where a center line of the vehicle in a width direction is located;

wherein a cylinder front line running within the longitudinal mid-plane between the front differential output axis and a projection of the cylinder head mid-point on the longitudinal mid-plane has a cylinder front line length (L1), wherein a cylinder rear line running within the longitudinal mid-plane between the rear differential output axis and the projection of the cylinder head mid-point on the longitudinal mid-plane has a cylinder rear line length (L2), and wherein a ratio (L1/L2) of the cylinder front line length (L1) to cylinder rear line length (L2) is in the range from 0.4 to 1.8;

wherein the transmission comprises a continuously variable transmission ("CVT") having a CVT cooling air inlet on a front end of the CVT and a CVT cooling air outlet on a rear end of the CVT, with the CVT including its CVT cooling air inlet and its CVT cooling air outlet being on a first side of the longitudinal mid-plane; and wherein the exhaust pipe is arranged on a second side of the longitudinal mid-plane opposing the first side.

2. The off-road vehicle of claim 1, wherein a cylinder front angle ($\alpha$1) is defined between the cylinder axis and the cylinder front line (L1), wherein a cylinder rear angle ($\alpha$2) is defined between the cylinder axis and the cylinder rear line (L2), and wherein a ratio ($\alpha$1/$\alpha$2) of cylinder front angle ($\alpha$1) to cylinder rear angle ($\alpha$2) is in the range from 0.15 to 0.4.

3. The off-road vehicle of claim 1, wherein the frame comprises two upper main beam tubes arranged to run longitudinally on opposing sides of the longitudinal mid-plane, two lower main beam tubes arranged to run longitudinally on opposing sides of the longitudinal mid-plane, and a plurality of vertically extending tubes connecting the upper main beam tubes and the lower main beam tubes, wherein the upper main beam tubes and the lower main beam tubes are spaced so as to allow the prime mover assembly including its cylinder head and CVT to be directly removed or inserted from one side of the frame.

4. The off-road vehicle of claim 3, wherein the plurality of vertically extending tubes comprise two front uprights substantially defining a front of the frame, two rear uprights substantially defining a rear of the frame, two forward-lean supports between the front uprights and the prime mover assembly, two rearward-lean supports between the prime mover assembly and the rear uprights, two front suspension connection tubes running longitudinally between the forward-lean supports and the corresponding front uprights, and two rear suspension connection tubes running longitudinally between the rearward-lean supports and the corresponding rear uprights, and wherein a projection of the prime mover assembly on the longitudinal mid-plane is substantially located within an area enclosed by projections of the forward-lean supports, the rearward-lean supports, the upper main beam tubes, and the lower main beam tubes all on the longitudinal mid-plane.

5. The off-road vehicle of claim 3, wherein at least one of the upper main beam tubes includes corners which define an upwardly arched avoidance portion to give additional clearance for removal or insertion of the prime mover assembly including its cylinder head to be directly removed or inserted from one side of the frame.

6. The off-road vehicle of claim 4, further comprising:

a fuel tank supported by the two rear suspension connection tubes; and two foot plates symmetrically arranged with respective to the longitudinal mid-plane, wherein projections of the two foot plates on the longitudinal mid-plane are substantially below the projection of the prime mover assembly on the longitudinal mid-plane.

7. The off-road vehicle of claim 4, wherein the prime mover assembly further comprises a power output shaft, and wherein all of the axis of the power output shaft, the axis of the front drive shaft, and the axis of the rear drive shaft are located on the longitudinal mid-plane.

8. The off-road vehicle of claim 7, wherein all of the axis of the power output shaft, the axis of the front drive shaft, and the axis of the rear drive shaft are coaxial.

9. The off-road vehicle of claim 7, wherein the plurality of wheels are sized such that an axis of the power output shaft slopes upwardly and rearwardly at a power output shaft slope angle in the range from greater than 0 degrees to 15 degrees above horizontal.

10. The off-road vehicle of claim 1, wherein the prime mover assembly comprises a power output shaft, wherein a point (M) is defined where a transverse vertically-extending plane through the cylinder head mid-point intersects with a rotational axis of the power output shaft, wherein a ratio (L3/L4) of a front power output line distance (L3) from the point (M) to the front differential output axis on the longitudinal mid-plane to a rear power output line distance (L4) from the point (M) to the rear differential output axis on the longitudinal mid-plane is in the range from 0.9 to 1.5.

11. The off-road vehicle of claim 10, wherein a ratio (H1/L4) of a cylinder head clearance height (H1) of the cylinder head mid-point over the point (M) to the rear power output line distance (L4) is in the range from 0.4 to 0.78.

12. The off-road vehicle of claim 1, wherein the CVT has a drive pulley with a drive pulley rotation axis and a driven pulley with a driven pulley rotation axis, the continuously variable transmission being oriented such both the drive pulley rotation axis and the driven pulley rotation axis extend horizontally in the transverse direction, wherein the driven pulley rotation axis is closer than the drive pulley rotation axis to a transverse vertical plane through the cylinder head mid-point.

13. The off-road vehicle of claim 12, further comprising a fuel tank with a filler neck, wherein the filler neck is on the first side of the longitudinal mid-plane.

14. The off-road vehicle of claim 13, wherein the muffler crosses the longitudinal mid-plane, and further comprising:

an intake assembly and a vehicle cover, wherein the air intake assembly is used to intake air to the engine, and the vehicle cover at least partially covers the frame, wherein the air intake assembly comprises an air filter having a door or cover which is movable relative to an air filter housing, wherein the air filter housing extends across the longitudinal mid-plane, and wherein the door or cover of the air filter is entirely on the first side of the longitudinal mid-plane, exposed for opening the air filter from outside the vehicle cover on that first side of the longitudinal mid-plane.

15. The off-road vehicle of claim 1, wherein the prime mover assembly further comprises a power output shaft, wherein the transmission comprises a gearbox having a main drive gear shaft and a secondary driven gear shaft with meshing gears to control the gear switching of the off-road vehicle; wherein an axis of the secondary driven gear shaft is substantially parallel to an axis of the main drive gear shaft and is substantially perpendicular to an axis of the power output shaft.

16. The off-road vehicle of claim 15, wherein the gearbox has an overall gearbox height (H2) and the prime mover assembly has an overall engine height (H3), wherein a ratio (H2/H3) of the overall gearbox height (H2) to the overall engine height (H3) is in the range from 0.2 to 0.5.

17. The off-road vehicle of claim 15, wherein the power output shaft has an input bevel gear meshed with an output bevel gear of the secondary driven gear shaft, and the input bevel gear is at least partially arranged in front of the secondary driven gear shaft.

18. The off-road vehicle of claim 1, further comprising two foot plates arranged at opposing sides of the longitudinal mid-plane, wherein a transverse vertically-extending plane through the cylinder head mid-point intersects the two foot plates.

19. The off-road vehicle of claim 18, wherein a front foot plate length (L5) is defined from a front edge of the foot plates longitudinally to the transverse vertically-extending plane through the cylinder head mid-point, wherein a rear foot plate length (L6) is defined from a rear edge of the foot plates longitudinally to the transverse vertically-extending plane through the cylinder head mid-point, and wherein a ratio (L5/L6) of the front foot plate length (L5) to the rear foot plate length (L6) is in the range from 0.5 to 4.

20. An off-road vehicle, comprising:
a frame;

a plurality of wheels, the plurality of wheels comprising at least one front wheel and at least one rear wheel;

a suspension assembly comprising a front suspension and a rear suspension, the front wheel being connected to the frame by the front suspension, and the rear wheel being connected to the frame by the rear suspension;

a prime mover assembly comprising an engine and a transmission, the engine being arranged on the frame and comprising an engine body and a cylinder head connected to the engine body, the engine body defining a cylinder axis which slants upwardly and rearwardly, the cylinder head having a cylinder head mid-point where the cylinder axis intersects an exterior surface of the cylinder head;

a drive train mounted on the frame, the drive train comprising:
  a front drive train connected to the front wheel, the front drive train comprising a front drive shaft and a front differential having a front differential output axis; and
  a rear drive train connected to the rear wheel, the rear drive train comprising a rear drive shaft and a rear differential having a rear differential output axis; and an intake assembly and a vehicle cover, wherein the air intake assembly is used to intake air to the engine, and the vehicle cover at least partially covers the frame, wherein the air intake assembly comprises an air filter having a door or cover which is movable relative to an air filter housing;

wherein a longitudinal mid-plane is defined as a plane perpendicular to a width direction of the vehicle where a center line of the vehicle in a width direction is located; and wherein the air filter housing extends across the longitudinal mid-plane, and wherein the door or cover of the air filter is entirely on a first side of the longitudinal mid-plane, exposed for opening the air filter from outside the vehicle cover on that first side of the longitudinal mid-plane.

* * * * *